(12) United States Patent
Hwang et al.

(10) Patent No.: US 8,850,111 B2
(45) Date of Patent: Sep. 30, 2014

(54) INFORMATION STORAGE MEDIUM, AND RECORDING/REPRODUCING METHOD AND APPARATUS

(75) Inventors: Sung-hee Hwang, Suwon-si (KR); Kyung-geun Lee, Seongnam-si (KR); In-ho Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 12/788,499

(22) Filed: May 27, 2010

(65) Prior Publication Data

US 2010/0306487 A1 Dec. 2, 2010

Related U.S. Application Data

(60) Provisional application No. 61/181,433, filed on May 27, 2009, provisional application No. 61/224,546, filed on Jul. 10, 2009.

(30) Foreign Application Priority Data

Feb. 2, 2010 (KR) .................. 10-2010-0009638

(51) Int. Cl.
*G06F 12/16* (2006.01)
*G11B 20/18* (2006.01)
(52) U.S. Cl.
CPC ...... *G11B 20/1883* (2013.01); *G11B 2220/235* (2013.01); *G11B 2220/2537* (2013.01); *G11B 2020/1826* (2013.01); *G11B 2220/20* (2013.01)
USPC .................... 711/112; 711/162; 711/E12.103
(58) Field of Classification Search
USPC .................................. 711/112, 162, E12.103
See application file for complete search history.

(56) References Cited

U.S. PATENT DOCUMENTS

| 6,373,800 | B1 | 4/2002 | Takahashi |
| 2002/0075735 | A1 | 6/2002 | Kibashi et al. |

(Continued)

FOREIGN PATENT DOCUMENTS

| CN | 1652217 A | 8/2005 |
| JP | 2005-222599 A | 8/2005 |

(Continued)

OTHER PUBLICATIONS

International Search Report issued on Dec. 30, 2010, in corresponding PCT International Application No. PCT/KR2010/003334 (8 pages).

(Continued)

*Primary Examiner* — Yong Choe
(74) *Attorney, Agent, or Firm* — NSIP Law

(57) ABSTRACT

An information storage medium includes: a user data area for recording user data; a spare area including spare blocks each for replacing a defective block occurring in the user data area; and a defect management area in which information about the defective block occurring in the user data area is recorded, wherein the spare blocks of the spare area include usable spare blocks with replacement blocks existing in forward parts of the usable spare blocks in a usage order, and usable spare blocks without replacement blocks existing in forward parts of the usable spare blocks in the usage order, wherein a next available position pointer of the spare area is recorded in the defect management area, and the next available position pointer of the spare area indicates a first usable spare block from among the usable spare blocks without the replacement blocks existing in the forward parts of the usable spare blocks in the usage order.

5 Claims, 11 Drawing Sheets

(56) References Cited

U.S. PATENT DOCUMENTS

| | | | |
|---|---|---|---|
| 2005/0149483 A1 | 7/2005 | Hwang et al. | |
| 2005/0175323 A1 | 8/2005 | Hoshizawa | |
| 2007/0297305 A1 | 12/2007 | Nakamura | |
| 2008/0022164 A1 | 1/2008 | Takahashi et al. | |
| 2010/0315916 A1* | 12/2010 | Takahashi et al. | 369/47.14 |
| 2010/0332926 A1 | 12/2010 | Takahashi et al. | |
| 2011/0188369 A1 | 8/2011 | Takahashi et al. | |

FOREIGN PATENT DOCUMENTS

| | | |
|---|---|---|
| JP | 2007-179601 A | 7/2007 |
| JP | 2008-047275 A | 2/2008 |
| WO | WO 2004/068476 | 8/2004 |
| WO | WO 2010/128590 A1 | 11/2010 |

OTHER PUBLICATIONS

Indonesian Office Action issued Mar. 22, 2013 in counterpart Indonesian Application No. W-00201104765 (4 pages, in Indonesian, with English translation).

Japanese Office Action mailed Oct. 15, 2013 in counterpart Japanese Application No. 2012-512968 (5 pages, in Japanese, with complete English translation of the substantive portion).

Chinese Office Action mailed Nov. 18, 2013 in counterpart Chinese Application No. 201080021369.0 (15 pages, in Chinese, with complete English translation).

Japanese Office Action Mailed May 13, 2014 in corresponding Japanese Application No. 2012-512968 (2 pages in Japanese, with complete English translation of the substantive portion and Certification of English Translation).

* cited by examiner

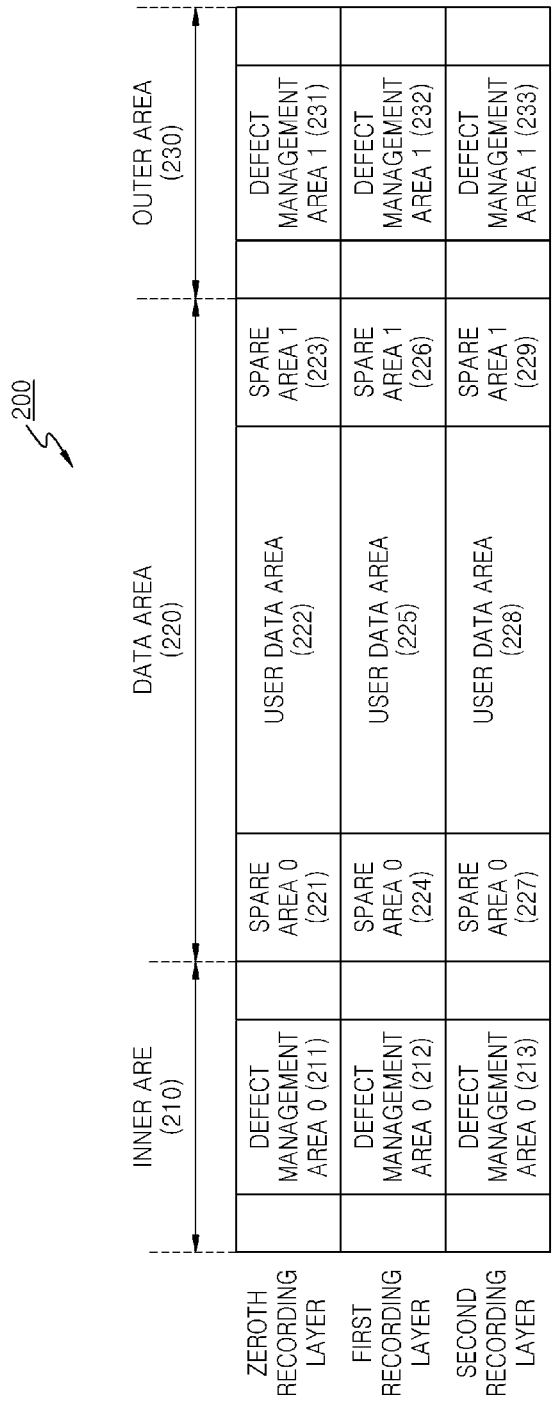

INFORMATION STORAGE MEDIUM, AND RECORDING/REPRODUCING METHOD AND
APPARATUS

CROSS-REFERENCE TO RELATED PATENT APPLICATIONS

This application claims the benefit of U.S. Provisional Patent Application Nos. 61/224,546 and 61/181,433, respectively filed on Jul. 10, 2009, and May 27, 2009, in the U.S. Patent and Trademark Office, and of Korean Patent Application No. 10-2010-0009638, filed on Feb. 2, 2010, in the Korean Patent Intellectual Office, the disclosure of each of which is incorporated herein by reference in its entirety for all purposes.

BACKGROUND

1. Field

The following description relates to an information storage medium, and a recording/reproducing method and recording/reproducing apparatus.

2. Description of the Related Art

In general, information storage media supporting defect management include a spare area for replacement purposes in case a defect occurs in a user area. A defective block occurring in the user area is replaced with a usable spare block of the spare area, and information about the replacement is managed by using defect information. Also, defect information about a defect occurring in the spare area as well as in the user area is also managed by using the defect information. The defect information and information necessary for disk management are stored and managed in a defect management area. At least one defect management area is formed on an inner area or an outer area of a disk-type medium. The defect information and the information necessary for disk management are called defect management information, and the defect management information is stored in the defect management area. The defect management area is also called a disk management area.

FIGS. 1A and 1B are reference views for explaining a spare area of a conventional disk 100 that performs defect management.

FIG. 1A is a layout of the conventional disk 100 that is a single-layer disk.

Referring to FIG. 1A, the conventional disk 100 includes a lead-in area 110, a spare area 120, a user data area 130, and a lead-out area 140.

The lead-in area 110 and the lead-out area 140 include disk-related information and information about a defect occurring in the user data area 130.

User data is recorded in the user data area 130, and the spare area 120 includes spare blocks. If a defect occurs in the user data recorded in the user data area 130, each of the spare blocks substitutes for a defective block where the defect occurs.

In general, once one usage order is determined, the spare blocks of the spare area 120 are sequentially used in the usage order. FIG. 1A illustrates a state where when the spare area 120 is used in a usage order from an inner area of the conventional disk 100 where the lead-in area 110 exists to an outer area of the conventional disk 100 where the lead-out area 140 exists, spare blocks 1, 2, 3, 4, 5, 6, and 7 have already been substituted as replacement blocks for defective blocks of the user data area 130. In FIG. 1A, the spare blocks 1, 2, 3, 4, 5, 6, and 7 are shown as replacement spare blocks and other spare blocks 8, 9, 10, 11, and 12 are shown as usable spare blocks.

However, the replacement blocks 1, 2, 3, 4, 5, 6, and 7 that have already substituted for the defective blocks in the spare area 120 may be changed to usable spare blocks for several reasons.

That is, although the spare blocks 1, 2, 3, 4, 5, 6, and 7 of the spare area 120 have already been substituted as replacement blocks for the defective blocks of the user data area 130 as shown in FIG. 1A, the spare blocks 3, 4, and 5 may be changed to usable spare blocks for several reasons as shown in FIG. 1B.

Such reasons may vary according to the policy of a driver that provides defect management. For example, the conventional disk 100 may be certified while the driver uses the conventional disk 100. At the time of certification of the conventional disk 100, if it is determined that replacement entries for the replacement blocks 3, 4, and 5 are no longer necessary for a certain reason, the driver removes the replacement entries for the replacement blocks 3, 4, and 5 from a defect list. Once the replacement entries for the replacement blocks 3, 4, and 5 are removed, information indicating that the replacement blocks 3, 4, and 5 are replacement blocks is removed, enabling the replacement blocks 3, 4, and 5 to be used as usable spare blocks.

Accordingly, even though the spare blocks of the spare area 120 are sequentially used, replaced spare blocks and usable spare blocks may be arranged at random as shown in FIG. 1B. Conventional disks 100 do not provide management of information about the spare area 120, for example, information about which usable spare block is to be used from among usable spare blocks of the spare area 120 as shown in FIG. 1B so as to allow the driver to effectively manage the spare area 120.

SUMMARY

In one general aspect, there is provided an information storage medium, including: a user data area configured to record user data, a spare area including a plurality of spare blocks, each spare block configured to replace a defective block occurring in the user data area, and a defect management area in which information about each defective block occurring in the user data area is recorded, wherein the plurality of spare blocks of the spare area include: a usable spare block with a replacement block existing in forward parts of the usable spare block in a usage order, and a usable spare block without a replacement block existing in forward parts of the usable spare block in the usage order, wherein a next available position pointer of the spare area is recorded in the defect management area, the next available position pointer of the spare area indicating a first usable spare block from among the plurality of usable spare blocks without the replacement blocks existing in the forward parts of the usable spare blocks in the usage order.

In another general aspect, there is provided a recording apparatus for recording data on an information storage medium, the recording apparatus including: a pickup configured to record data on the information storage medium, the information storage medium including: a user data area configured to record user data, a spare area including a plurality of spare blocks, each spare block configured to replace a defective block occurring in the user data area, and a defect management area in which information about each defective block occurring in the user data area is recorded, wherein the plurality of spare blocks of the spare area include: a usable spare block with a replacement block existing in forward parts of the usable spare block in a usage order, and a usable spare block without a replacement block existing in forward parts of the usable spare block in the usage order, and a control unit configured to control the pickup to record a next available position pointer of the spare area in the defect management area, the next available position pointer of the spare area indicating a first usable spare block from among the plurality of usable spare blocks without the replacement blocks existing in the forward parts of the usable spare blocks in the usage order.

In another general aspect, there is provided a reproducing apparatus for reproducing data from an information storage medium, the reproducing apparatus including: a pickup configured to reproduce data from the information storage medium, the information storage medium including: a user data area configured to record user data, a spare area including a plurality of spare blocks, each spare block configured to replace a defective block occurring in the user data area, and a defect management area in which information about each defective block occurring in the user data area is recorded, wherein the plurality of spare blocks of the spare area include: a usable spare block with a replacement block existing in forward parts of the usable spare block in a usage order, and a usable spare block without a replacement block existing in forward parts of the usable spare block in the usage order, and a control unit configured to control the pickup to reproduce a next available position pointer of the spare area from the defect management area, the next available position pointer of the spare area indicating a first usable spare block from among the plurality of usable spare blocks without the replacement blocks existing in the forward parts of the usable spare blocks in the usage order.

In another general aspect, there is provided a method of recording data on an information storage medium, the method including: recording data on the information storage medium, the information storage medium including: a user data area for recording user data, a spare area including a plurality of spare blocks, each spare block for replacing a defective block occurring in the user data area, and a defect management area in which information about each defective block occurring in the user data area is recorded, wherein the plurality of spare blocks of the spare area include: a usable spare block with a replacement block existing in forward parts of the usable spare block in a usage order, and a usable spare block without a replacement block existing in forward parts of the usable spare block in the usage order, and recording a next available position pointer of the spare area in the defect management area, the next available position pointer of the spare area indicating a first usable spare block from among the plurality of usable spare blocks without the replacement blocks existing in the forward parts of the usable spare blocks in the usage order.

In another general aspect, there is provided a method of reproducing data from an information storage medium, the method including: reproducing data from the information storage medium, the information storage medium including: a user data area for recording user data, a spare area including a plurality of spare blocks, each spare block for replacing a defective block occurring in the user data area, and a defect management area in which information about each defective block occurring in the user data area is recorded, wherein the plurality of spare blocks of the spare area include: a usable spare block with a replacement block existing in forward parts of the usable spare block in a usage order, and a usable spare block without a replacement block existing in forward parts of the usable spare block in the usage order, and reproducing a next available position pointer of the spare area from the defect management area, the next available position pointer of the spare area indicating a first usable spare block from among the plurality of usable spare blocks without the replacement blocks existing in the forward parts of the usable spare blocks in the usage order.

In another general aspect, there is provided an information storage medium, including: a user data area configured to record user data, a spare area including a plurality of spare blocks, each spare block configured to replace a defective block occurring in the user data area, and a defect management area in which information about each defective block occurring in the user data area is recorded, wherein defect information including information about replacement blocks of the spare area is removed during reinitialization of the information storage medium, and wherein a next available position pointer of the spare area is recorded in the defect management area, the next available position pointer of the spare area indicating a first usable spare block in a usage order.

In another general aspect, there is provided a recording apparatus for recording data on an information storage medium, the recording apparatus including: a pickup configured to record data on the information storage medium, the information storage medium including: a user data area configured to record user data, a spare area including a plurality of spare blocks, each spare block configured to replace a defective block occurring in the user data area, and a defect management area in which information about each defective block occurring in the user data area is recorded, and a control unit configured to: remove defect information including information about replacement blocks of the spare area from the defect management area during reinitialization of the information storage medium, and control the pickup to record a next available position pointer of the spare area in the defect management area, the next available position pointer of the spare area indicating a first usable spare block in the usage order.

In another general aspect, there is provided a reproducing apparatus for reproducing data from an information storage medium, the reproducing apparatus including: a pickup configured to reproduce data from the information storage medium, the information storage medium including: a user data area configured to record user data, a spare area including a plurality of spare blocks, each spare block configured to replace a defective block occurring in the user data area, and a defect management area in which information about each defective block occurring in the user data area is recorded, defect information including information about replacement blocks of the spare area being removed from the defect management area during reinitialization, and a control unit configured to control the pickup to reproduce a next available position pointer of the spare area from the defect management area the next available position pointer of the spare area indicating a first usable spare block in a usage order.

In another general aspect, there is provided a method of recording data on an information storage medium including a user data area for recording user data, a spare area including spare blocks each for replacing a defective block occurring in the user data area, and a defect management area in which information about the defective block occurring in the user data area is recorded, the method including: removing defect information including information about replacement blocks of the spare area from the defect management area during reinitialization of the information storage medium, and recording a next available position pointer of the spare area in the defect management area, the next available position pointer of the spare area indicating a first usable spare block in a usage order.

In another general aspect, there is provided a method of reproducing data from an information storage medium including a user data area for recording user data, a spare area including spare blocks each for replacing a defective block occurring in the user data area, and a defect management area in which information about the defective block occurring in the user data area is recorded, defect information including information about replacement blocks of the spare area being removed from the defect management area during reinitialization, the method including: reproducing a next available position pointer of the spare area from the defect management area, the next available position pointer of the spare area indicating a first usable spare block in a usage order.

Other features and aspects will be apparent from the following detailed description, the drawings, and the claims.

BRIEF DESCRIPTION OF THE DRAWINGS

FIG. 2 illustrates an information storage medium according to an embodiment.

Figure 1A:
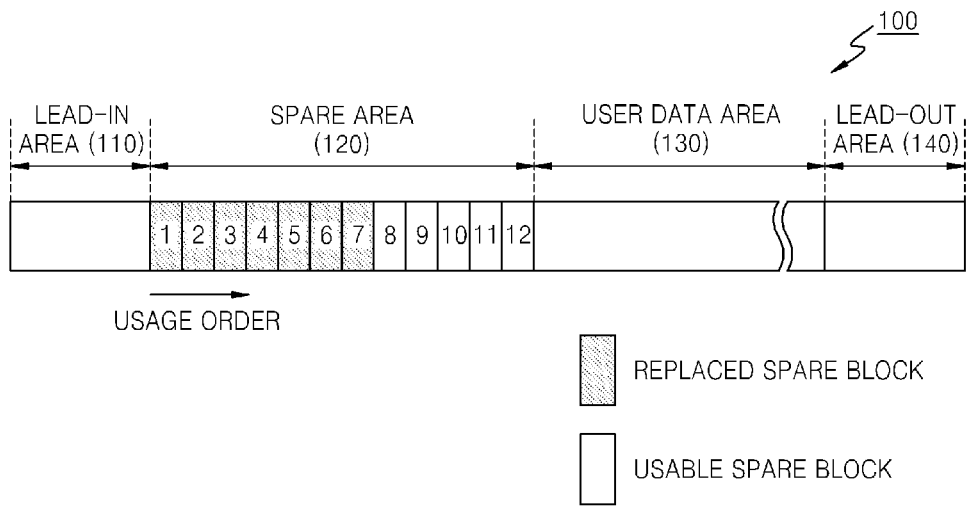
FIGS. 1A and 1B are reference views for explaining a spare area of a conventional disk that performs defect management.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 2 illustrates an information storage medium 200 according to an embodiment.

Referring to FIG. 2, the information storage medium 200 may include three layers, that is, a zero$^{th}$ recording layer, a first recording layer, and a second recording layer; and each of the zero$^{th}$ recording layer, the first recording layer, and the second recording layer may include an inner area 210, a data area 220, and an outer area 230. Although the information storage medium 200 having the three layers is illustrated in FIG. 2, embodiments may be applied to an information storage medium having one layer or two layers, and the number of recording layers is not limited.

The zero$^{th}$ recording layer may include a defect management area 211 in the inner area 210, a spare area 0 221, a user data area 222, a spare area 1 223 in the data area 220, and a defect management area 231 in the outer area 230. The first recording layer may include a defect management area 0 212 in the inner area 210, a spare area 0 224, a user data area 225, a spare area 1 226 in the data area 220, and a defect management area 232 in the outer area 230. The second recording layer may include a defect management area 0 213 in the inner area 210, a spare area 0 227, a user data area 228, a spare area 1 229 in the data area 220, and a defect management area 233 in the outer area 230.

The user data area of each of the zero$^{th}$, first, and second recording layers is an area for recording user data.

The spare area of each of the zero$^{th}$, first, and second recording layers is an area for recording replacement data for replacing a defective block detected in the user data area.

The defect management area of each of the zero$^{th}$, first, and second recording layers is an area for recording information about the defective block detected in the user data area. Information about the defective block is typically called a defect list.

Figure 3:
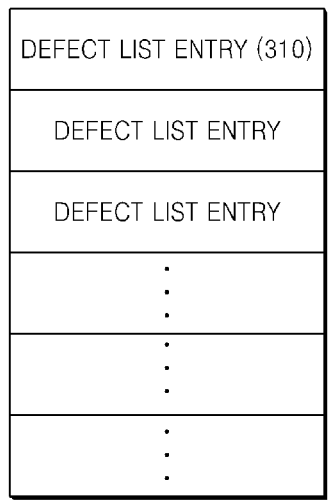
FIG. 3 illustrates a structure of a defect list according to an embodiment.

FIG. 3 illustrates a structure of a defect list 300 according to an embodiment.

Referring to FIG. 3, the defect list 300 may include one or more defect list entries 310. Each of the one or more defect list entries 310 may include position information of a defective block, position information of a replacement block existing in a spare area and substituted for the defective block, and state information of the defective block or the replacement block.

In particular, according an embodiment, a next available position pointer of the spare area may be recorded in a defect management area. As described above with reference to FIG. 1B, even though spare blocks of the spare area are sequentially used, replaced spare blocks and usable spare blocks may be arranged at random. In one example, the next available position pointer of the spare area may indicate a usable spare block without a replacement block existing in a forward part of the usable spare block in a usage order of the spare area.

Figure 1B:
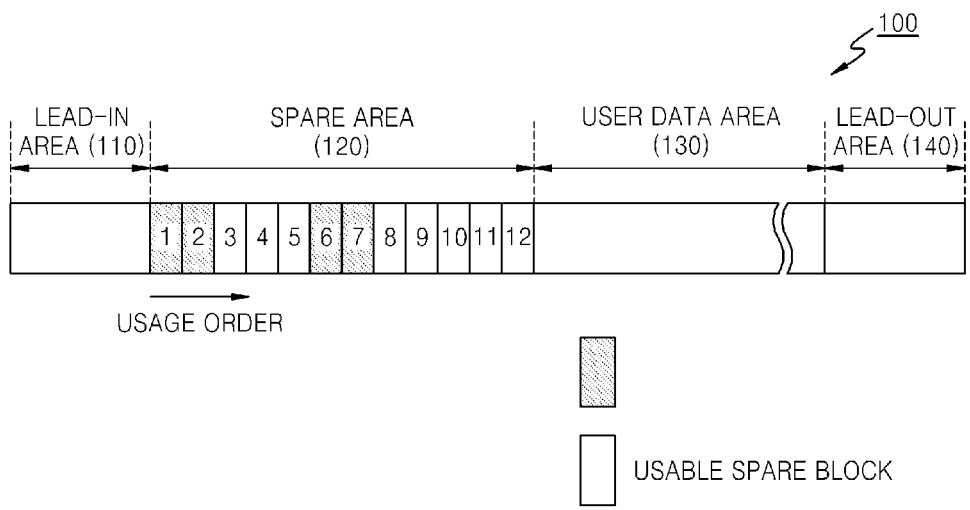

That is, referring to FIG. 1B, replaced blocks 1, 2, 6, and 7 and usable spare blocks 3, 4, 5, 8, 9, 10, 11, and 12 may exist together in a spare area 120. A next available position pointer of the spare area 120 may indicate one of the usable spare blocks 3, 4, 5, 8, 9, 10, 11, and 12. The usable spare blocks 3, 4, 5, 8, 9, 10, 11, and 12 may be divided into two groups. One group may include the usable spare blocks 3, 4, and 5 including replacement blocks 6 and 7 existing in forward parts of the usable spare blocks 3, 4 and 5 in a usage order in which the spare blocks are to be used, and the other group may include the usable spare blocks 8, 9, 10, 11, and 12 not including any replacement block existing in forward parts thereof in the usage order. For example, the spare blocks 4 through 12 may be located in the forward part of the usable spare block 3 in the usage order, and the spare blocks 9 through 12 may be located in the forward part of the usable spare block 8 in the usage order.

A next available position pointer of a spare area according an embodiment may indicate a first usable spare block from among usable spare blocks without replacement blocks existing in forward parts thereof in a usage order. In FIG. 1B, the next available position pointer of the spare area 120 according an embodiment may indicate the usable spare block 8. If the next available position pointer of the spare area 120 indicates the spare block 3, since the spare blocks 6 and 7, which have already substituted for defective blocks, exist in the forward part of the spare block 3, whenever a spare block of the spare area 120 is used, it may be determined whether the spare block is a usable spare block or not. That is, since the spare blocks 6 and 7 are replacement blocks that have already substituted for defective blocks and replacement data is recorded in the spare blocks 6 and 7, the spare blocks 6 and 7 may not be used for other defective blocks. Accordingly, if such replacement blocks are allowed to be included in spare blocks that are to be used, a driver may determine whether a spare block is a replacement block or not whenever the spare block is used. However, since may take a lot of time to determine whether a spare block is a replacement block, replacement blocks may not be included in spare blocks that are to be used in the usage order. To this end, in FIG. 1B, among usable spare blocks with replacement blocks existing in forward parts thereof and usable spare blocks without replacement blocks existing in forward parts thereof, the next available position pointer of the spare area 120 may indicate the usable spare blocks without the replacement blocks existing in the forward parts thereof, and may indicate a first usable spare block from among the usable spare blocks not including the replacement blocks existing in the forward parts thereof.

In other words, in general, since defect list entries in a defect list are typically arranged and stored in a defective block address order and then a replacement block address order, replacement blocks registered in replacement entries may be randomly stored, and thus all of the replacement entries may be examined in order to determine replacement blocks stored in the replacement entries. Accordingly, if a block after a next available spare block is registered as a replacement block of the replacement entries after the next available spare block is used as a replacement block, all of the replacement entries may be searched in order to find a spare block to be used next, taking a lot of time to perform defect management. Accordingly, in the information storage medium 200 according an embodiment, there may be no replacement block after a next available spare block.

Figure 4A:
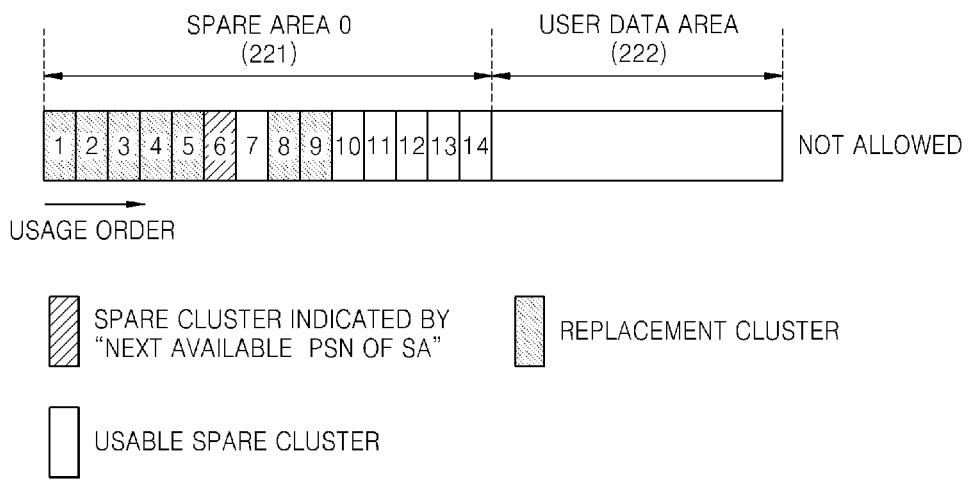
FIGS. 4A through 4C are reference views.
Figure 4B:
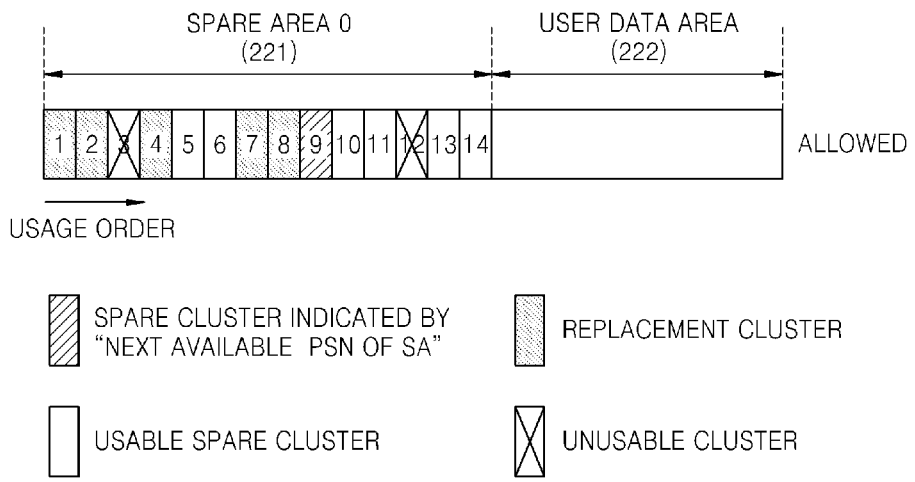
Figure 4C:
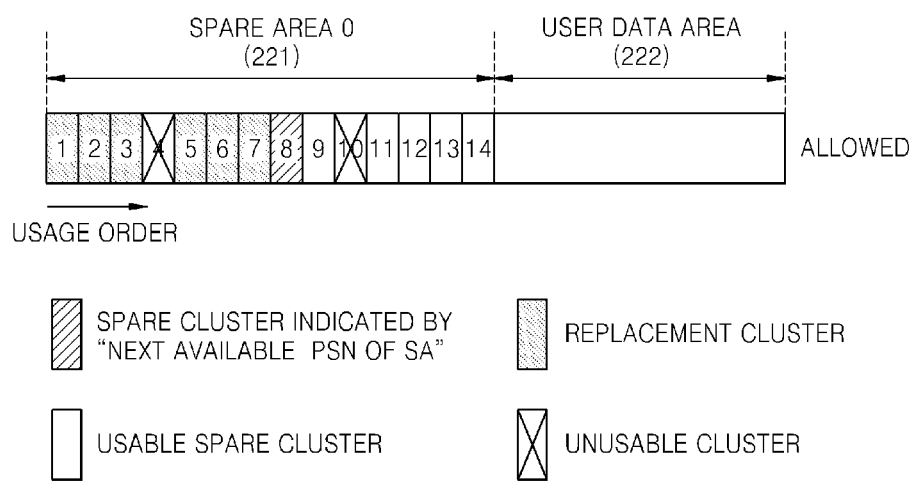

FIGS. 4A through 4C are reference views for explaining the reason why there may be no replacement block existing after the position of a next available spare block.

The spare area 0 221 and the user data area 222 are illustrated in FIGS. 4A through 4C, and the spare area 0 221 may include 14 spare clusters. Each of a spare block and a spare cluster is a unit of a spare area in which data is recorded, and there may be little difference between the spare block and the spare cluster and thus the spare block and the spare cluster may be used interchangeably. The term "spare cluster" will be used when explaining FIGS. 4A through 4C.

Referring to FIG. 4A, spare clusters 1, 2, 3, 4, 5, 8, and 9 are replacement clusters, and spare clusters 7, 10, 11, 12, 13, and 14 are usable clusters. A spare cluster 6 is a spare cluster designated by a next available physical sector number of the spare area 0 221.

In a usage order of the spare area 0 221, since the replacement clusters 8 and 9, may exist in a forward part of the spare cluster 6 which is designated by next available spare block, an example illustrated in FIG. 4A may not be allowed according an embodiment.

Referring to FIG. 4B, spare clusters 1, 2, 4, 7, and 8 are replacement clusters, spare clusters 3 and 12 are unusable spare clusters, and spare clusters 5, 6, 10, 11, 13, and 14 are usable spare clusters. A spare cluster 9 is a spare cluster designated by the next available physical sector number of the spare area 0 221.

Although the usable spare clusters 5 and 6 exist, if the spare cluster 9 not including replacement clusters existing in a forward part thereof is designated as a next available spare cluster, a problem, such as the waste of time taken to use a spare block of the spare area 0 221, may not occur. Accordingly, an example illustrated in FIG. 4B may be allowed according an embodiment. The spare cluster 12 existing in the forward part of the spare cluster 9 is an unusable cluster. Such an unusable spare cluster may not cause any problem, unlike a replacement cluster. This is because defect information may be sorted and stored in a defect list, generally, in a state information order based on state information indicating a defect type, a defective cluster physical address order, and then a next replacement cluster physical address order. In an example of defect information having replacement clusters, since the defect information may be stored in a defect type order and then a defective cluster physical address order, the replacement clusters may be arranged at random. In order to know whether a certain spare cluster is replaced or not, all of the defect information including the replacement clusters may be searched. However, in an example of an unusable cluster, since there is no physical address for defective clusters, the same value, for example, 0, may be set to physical address fields of the defective clusters. Since the defect information may be stored in a replacement cluster physical address order, an unusable cluster can be easily identified.

Referring to FIG. 4C, spare clusters 1, 2, 3, 5, 6, and 7 are replacement clusters, spare clusters 4 and 10 are unusable clusters, and spare clusters 9, 11, 12, 13, and 14 are usable clusters. A spare cluster 8 is a spare cluster designated by the next available physical sector number of the spare area 0 221.

Since the spare cluster 8, not including replacement clusters existing in a forward part thereof in a usage order, is used as a next available spare cluster, a problem, such as the waste of time taken to use a spare block of the spare area 0 221, may not occur. Accordingly, an example illustrated in FIG. 4C may be allowed according to an embodiment.

Among usable spare blocks including replacement blocks existing in forward parts thereof and usable spare blocks without replacement blocks existing in forward parts thereof, a next available position pointer of a spare area may indicate the usable spare blocks without the replacement blocks existing in the forward parts thereof, for a full period of time that a disk is in use. That is, while the disk is initialized and used, the next available position pointer of the spare area may indicate the usable spare blocks without the replacement blocks existing in the forward parts thereof, and even after the disk is reinitialized, the next available position pointer of the spare area may indicate the usable spare blocks without the replacement blocks existing in the forward parts thereof. The use of an embodiment during reinitialization will be explained with reference to FIGS. 5A through 6B.

A defect list entry will be explained before explaining FIG. 5A. As described above, a defect management information area may include a defect list, and the defect list may include defect list entries 310. The defect list entries 310 may include defect state information, defective block address information, consecutive state information, and replacement block address information.

The defect state information may include the following information.

Type 1-1 (replacement entry 1): indicating a state where a defective block is replaced with a replacement block and content thereof is stored in the replacement block.

Type 1-2 (replacement entry 2): indicating a state where a defective block is replaced with a replacement block and content thereof is not stored in the replacement block. The information Type 1-1 and the information Type 1-2 indicate replacement entries.

Type 2 (simple defect entry): indicating a defective block not including a replacement block. For example, information different from address information shown in an address area of a disk, such as 0, is set to a replacement block address. The information Type 2 indicates a simple defect entry.

Type 3: indicating a usable spare block. For example, information different from address information shown in an address area of a disk, such as 0, is set to an address 230 of a defective block. The information Type 3 indicates a usable spare entry.

Type 4: indicating an unusable spare block. For example, information different from address information shown in an address area of a disk, such as 0, is set to an address 230 of the defective block. The information Type 4 indicates an unusable spare entry.

The defective block address information is address information of a defective block.

The consecutive state information may include the following information.

Information 1: indicating a single defect entry other than consecutive defect entries.

Information 2-1: indicating a start entry of consecutive defects. For example, a defective block address is a start address of consecutive defective blocks, and a replacement block address is a start address of consecutively replaced blocks.

Information 2-2: indicating an end entry of consecutive entries. For example, a defective block address 230 is an end address of consecutive defective blocks, and a replacement block address is an end address of consecutively replaced blocks.

The replacement block address information is address information of a replacement block, that is, information about a replacement block address or an address of a defective block of a spare area.

Usable spare block entries of the defect list entries may not be stored as defect management information. This is because since the size and position of a spare area allocated to a data area are already known by using the defect management information, usable spare blocks can be found by using only unusable spare block entries and replacement entry information. Of course, if usable spare block entries are not stored as defect information, in order to find usable spare blocks, it takes time to search for the unusable spare block entries and the replacement entries in the defect information. In order to reduce such a search time, information about a next available spare block in a usage order of a spare area may be managed by using defect management information. In other words, a time taken to search for usable spare blocks in the spare area can be reduced by storing information about the next available spare block of the spare area in the defect management information.

Reinitialization of an information storage medium providing defect management is performed by recording defect management information, which is re-generated under conditions of the reinitialization, in a defect management area. The re-generation of the defect management information may involve updating defect information through certification.

Types of the certification may include full certification for examining a full data area, and quick certification for examining only blocks registered in the defect information.

The defect management information may be newly formed according to the reinitialization of the information storage medium. At this time, states of defect list entries of the defect information may be changed during the reinitialization. For example, after the full data area including a spare area and a user data area is certified, the defect information may be updated according to a result of the certification. Alternatively, after only the blocks registered in the defect information are certified, the defect information may be updated according to a result of the certification.

Defect information of the defect management information generated after reinitialization according to an embodiment does not include "a defect entry (hereinafter, referred to as a replacement entry) indicating a state where a defective block is replaced with a replacement block". That is, if there is a replacement entry in existing defect information, the replacement entry may not exist in defect information after reinitialization by cutting off connection between the defective block and the replacement block or removing the replacement entry. Accordingly, blocks of the spare area newly allocated due to the reinitialization include usable spare blocks and unusable blocks that cannot be used due to defects, and there are no blocks corresponding to replacement entries.

One method of ensuring that there is no replacement entry in defect information after reinitialization may be performed through certification. This method involves removing a replacement entry in existing defect information through certification and not generating any replacement entry. That is, if it is determined through certification that a defective block of the replacement entry is no longer defective, the replacement entry is removed from defect information, and if it is determined that the defective block of the replacement entry is still defective, the replacement entry is changed to a simple defect entry indicating that only the defective block is defective. Also, a defective block found in a user data area through full certification is indicated by a simple defect entry without being replaced with a spare block of a spare area.

There is no replacement entry in defect information after full certification or quick certification. This means that a replacement block registered in a replacement entry in defect information before certification becomes a usable spare block after the certification, and blocks other than blocks that are defective, from among all blocks of a spare area become usable spare blocks.

For example, a replacement entry includes consecutive replacement entries indicating a state where consecutive defective blocks are replaced with consecutive replacement blocks, and a simple defect entry includes consecutive simple defect entries indicating consecutive defective blocks.

Figure 5A:
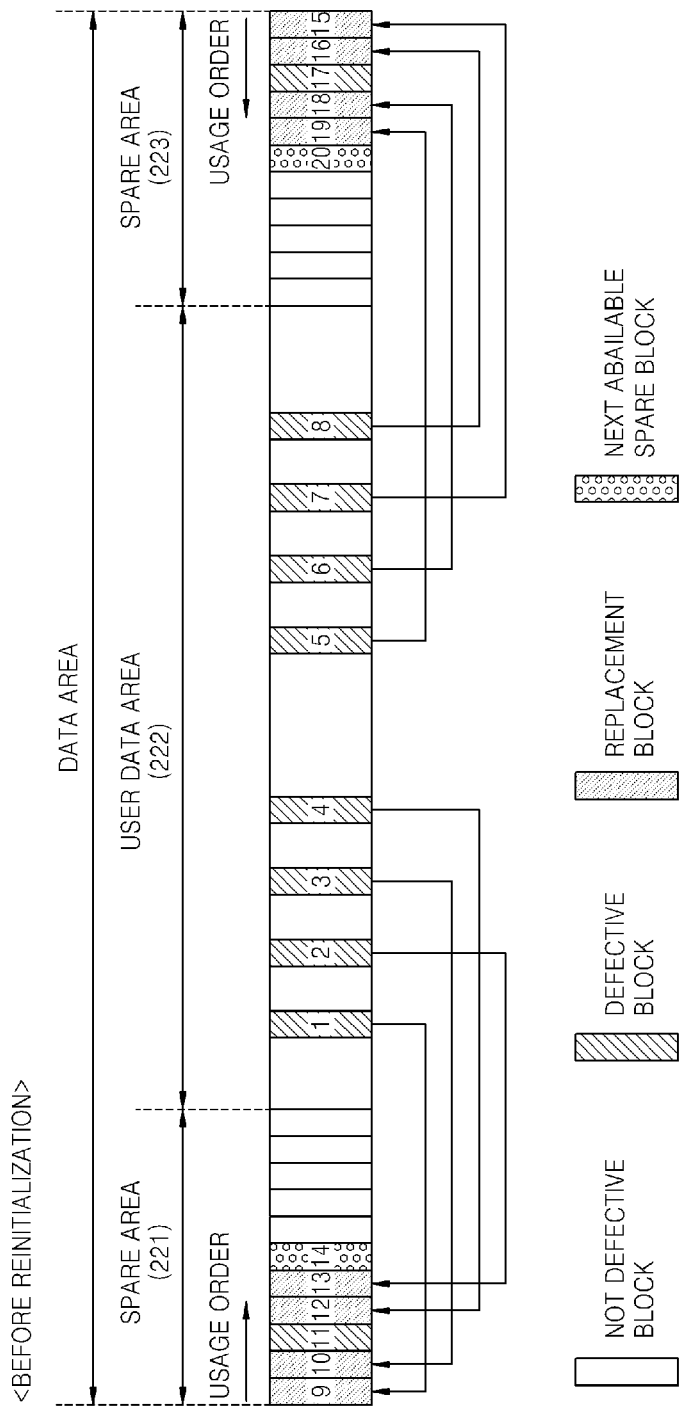
FIG. 5A illustrates a layout of a disk before reinitialization according to an embodiment.
Figure 5B:
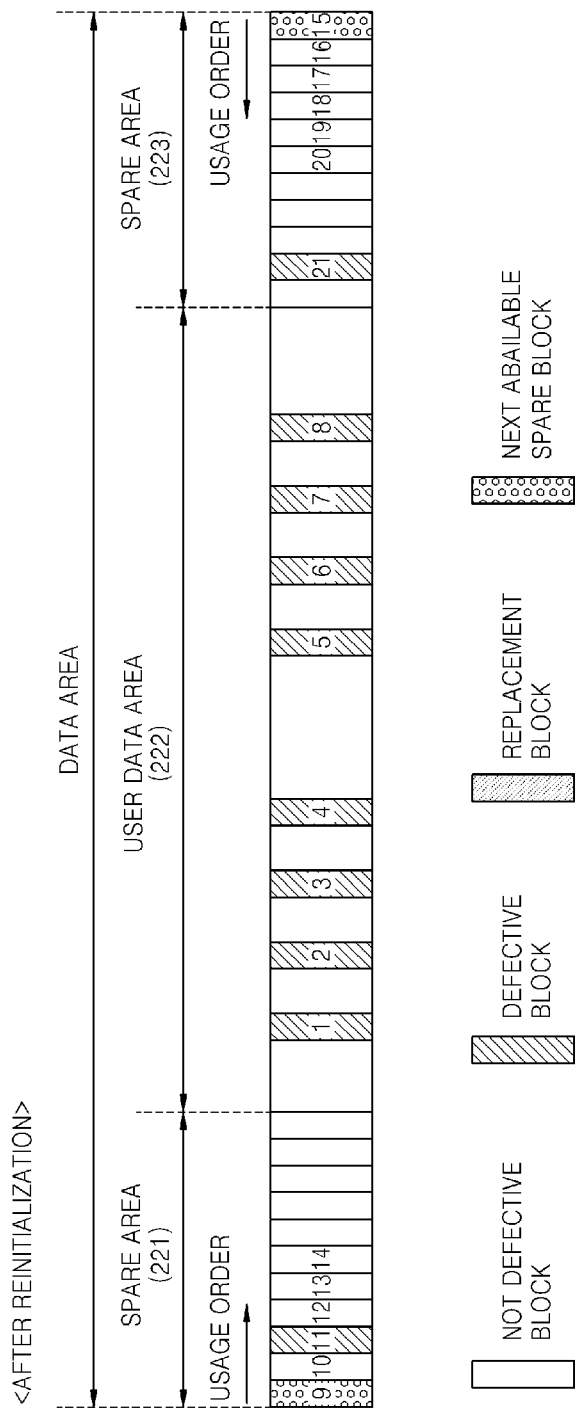
FIG. 5B illustrates a layout of the disk after reinitialization according to another embodiment.

FIG. 5A illustrates a layout of a disk before reinitialization according to an embodiment. FIG. 5B illustrates a layout of the disk after reinitialization according to another embodiment.

Referring to FIG. 5A, defective blocks 1 through 8 existing in the user data area 222 before reinitialization may be replaced in the spare areas 221 and 223. The defective blocks 1 through 4 may be respectively replaced with replacement blocks 9, 10, 12, and 13 of the spare area 221, and the defective blocks 5 through 8 may be respectively replaced with replacement blocks 15, 16, 18, and 19 of the spare area 223.

Figure 8:
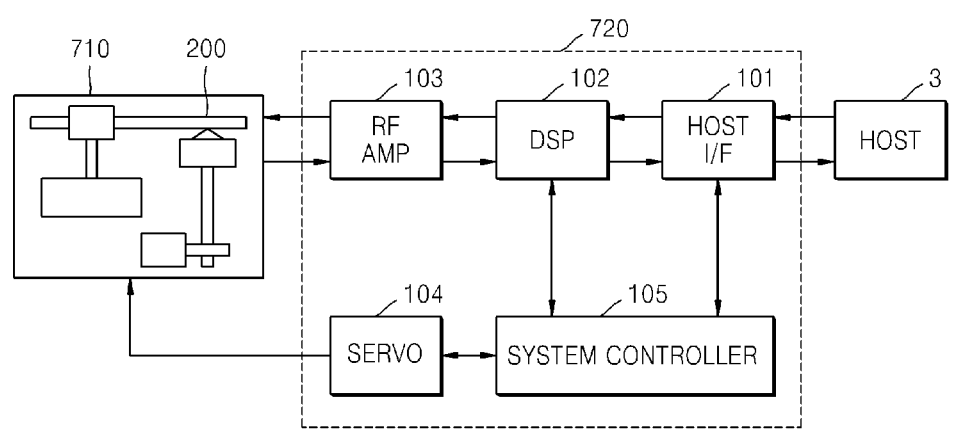
FIG. 8 is a block diagram of a driver including the recording/reproducing apparatus of FIG. 7, according to an embodiment.

A block 11 in the spare area 221 is a defective block, and a block 14 in the spare area 221 is designated as a next available spare block. A block 17 of the spare area 223 is a defective block, and a block 20 of the spare area 223 is designated as a next available spare block. In FIG. 5A, 8 replacement entries about each defective block are stored as defect information.

Referring to FIG. 5B, all replacement entries may be removed or changed from the defect information through reinitialization, and thus the defective blocks 1 through 8 may be registered in a simple defect entry during the reinitialization. That is, the replacement entries indicating that defective blocks are replaced with replacement blocks may be removed, information about the replacement blocks may be removed, and only a defect entry indicating that the defective blocks 1 through 8 are defective may remain. Accordingly, the replacement blocks 9, 10, 12, 13, 15, 16, 18, and 19 may become usable spare blocks. Accordingly, in FIG. 5B, the next available spare block may be changed to a first usable spare block in a given usage order of each spare area. That is, the spare block 9 may be designated as a next available spare block in the spare area 221, and the spare block 15 may be designated as a next available spare block in the spare area 230.

Figure 6A:
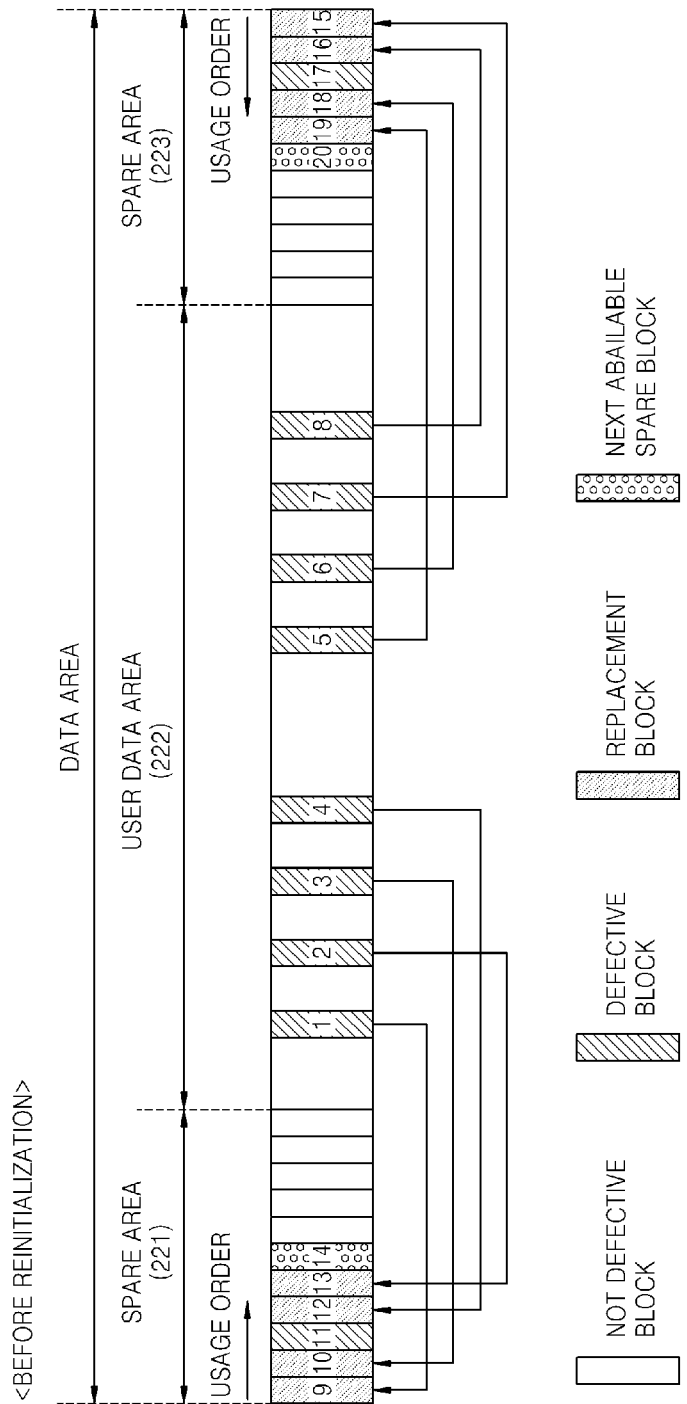
FIG. 6A illustrates a layout of the disk before reinitialization according to an embodiment.
Figure 6B:
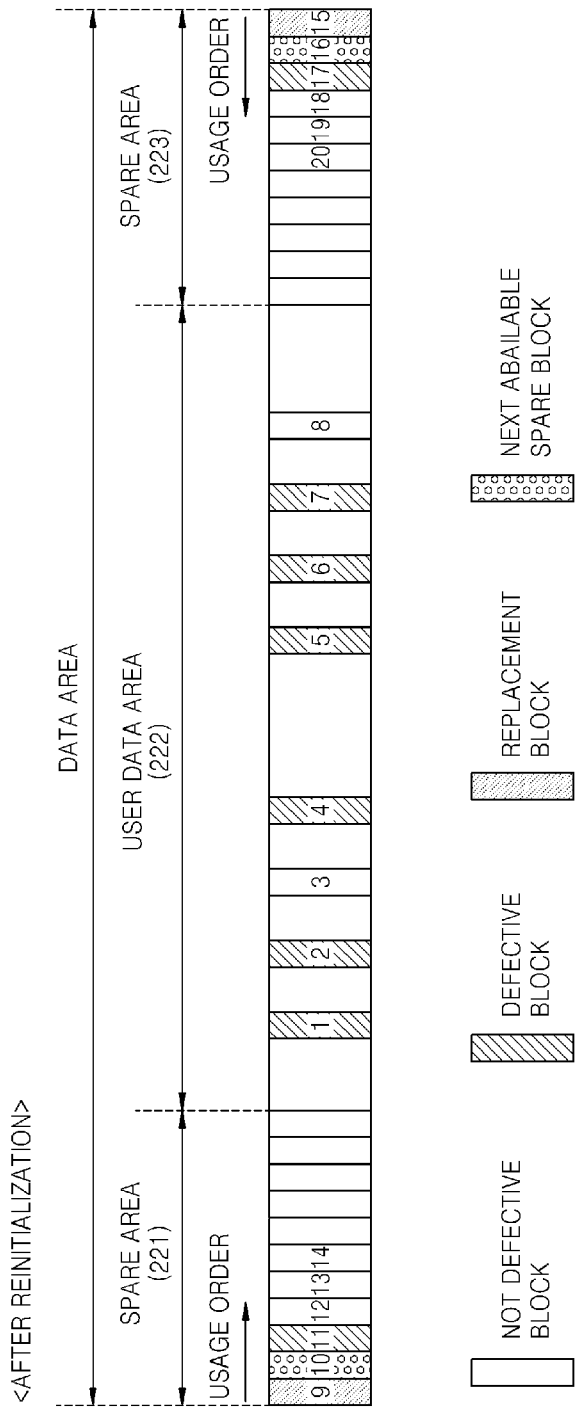
FIG. 6B illustrates a layout of the disk after reinitialization according to another embodiment.

FIG. 6A illustrates a layout of the disk before reinitialization according to an embodiment. FIG. 6B illustrates a layout of the disk after reinitialization according to another embodiment.

A state of FIG. 6A is the same as that of FIG. 5A.

Referring to FIG. 6B, it may be determined through certification that defective blocks 1 and 7 are still defective blocks after reinitialization, and thus their states may be maintained. It may be determined through the certification that existing defective blocks 3 and 8 are no longer defective blocks, and thus the existing defective blocks 3 and 8 may be removed from defect information and spare blocks that were substituting for the existing defective blocks 3 and 8 may become re-usable spare blocks. Each of replacement entries for defective blocks 2, 4, 5, and 6 may be changed to a simple defect entry. Also, a next available spare block may be changed to a first usable spare block in a given usage order of each spare area. That is, a spare block 10 may be designated as a next available spare block in the spare area 221, and a spare block 16 may be designated as a next spare block in the spare area 223.

Figure 7:
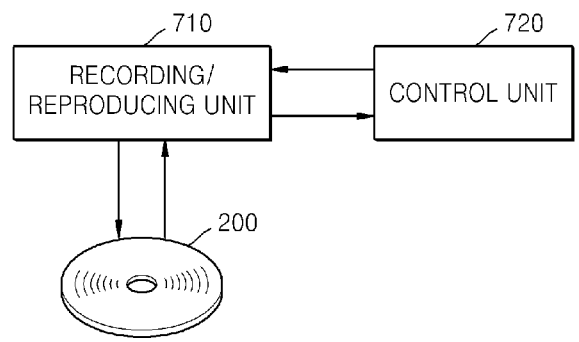
FIG. 7 is a block diagram of a recording/reproducing apparatus according to an embodiment.

FIG. 7 is a block diagram of a recording/reproducing apparatus according to an embodiment.

Referring to FIG. 7, the recording/reproducing apparatus includes a recording/reading unit 710 and a control unit 720.

The recording/reading unit 710 may record data on a recording medium 200, which is an information storage medium according to an embodiment, under the control of the control unit 720, and reads out recorded data.

The control unit 720 may control the recording/reading unit 710 to record or read data on or from the recording medium 200.

The recording/reproducing apparatus may be realized as a recording apparatus and a reproducing apparatus, or may be realized as one system as shown in FIGS. 6A and 6B.

FIG. 8 is a block diagram of a driver including the recording/reproducing apparatus of FIG. 7, according to an embodiment.

Referring to FIG. 8, the driver includes a pickup as the recording/reading unit 710. The recording medium 200 may be mounted on the pickup. Also, the driver may include a host interface (I/F) 101, a digital signal processing (DSP) unit 102, a radio frequency amplifier (RF AMP) 103, a servo 104, and a system controller 105 as the control unit 720.

In a recording mode, the host I/F 101 may receive data to be recorded and a write command from a host 3. The system controller 105 may perform initialization necessary for recording. The DSP unit 102 may perform error-correcting code (ECC) encoding by adding a parity for error correction to the data to be recorded, which was received from the host I/F 101, and then may modulate the ECC-encoded data by using a predetermined method. The RF AMP 103 may convert data output from the DSP unit 102 into an RF signal. The pickup may record the RF signal output from the RF AMP 103 on a recording medium 100. The servo 104 may receive a command necessary for servo control from the system controller 105 and may control the pickup.

Figure 9:
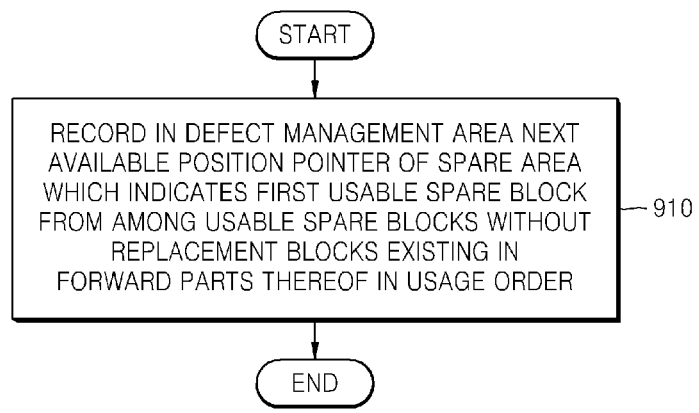
FIG. 9 is a flowchart illustrating a recording method according to an embodiment.

FIG. 9 is a flowchart illustrating a recording method according to an embodiment. Referring to FIG. 9, in operation 910, in particular, the system controller 105 may control the pickup to record in a defect management area a next available position pointer of a spare area which indicates a first usable spare block from among usable spare blocks without replacement blocks existing in forward parts thereof in a usage order. Also, although not shown in FIG. 9, at the time of reinitialization of the recording medium 100 that is an information storage medium, the system controller 105 may control so that defect information including information about replacement blocks of the spare area is removed from the defect management area and the next available position pointer of the spare area indicating the first usable spare block in the usage order of the spare area may be recorded in the defect management area.

In a reproduction mode, the host I/F 101 may receive a read command from the host 3. The system controller 105 may perform initialization necessary for reproduction. The pickup may emit a laser beam to the recording medium 100 one time, receive a laser beam reflected from the recording medium 100, and output an obtained optical signal. The RF AMP 103 may convert the optical signal output from the pickup into an RF signal, provide modulated data obtained from the RF signal to the DSP unit 102, and provide a servo signal obtained from the RF signal to the servo 104. The DSP unit 102 may demodulate the modulated data and output data obtained through error correction such as ECC. In the meantime, the servo 104 may control the pickup according to a command necessary for servo control received from the system controller 105 and the servo signal received from the RF AMP 103. The host I/F 101 may send the data received from the DSP unit 102 to the host 3.

Figure 10:
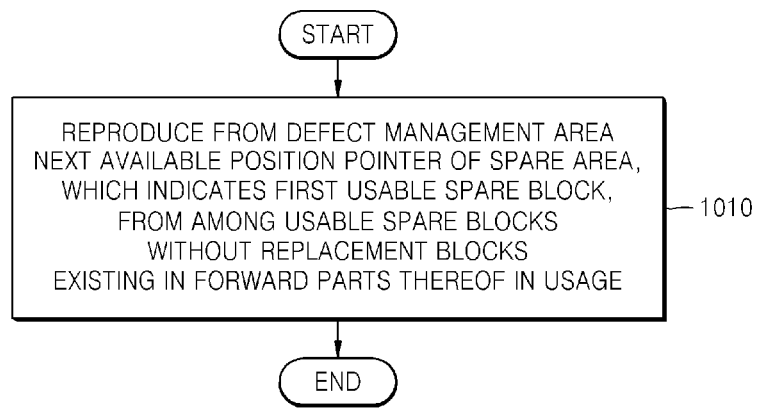
FIG. 10 is a flowchart illustrating a reproducing method according to an embodiment.

FIG. 10 is a flowchart illustrating a reproducing method according to an embodiment. Referring to FIG. 10, in operation 1010, in particular, the system controller 105 may control the pickup to read from a defect management area a next available position pointer of a spare area which indicates a first usable spare block from among usable spare blocks without replacement blocks existing in forward parts thereof in a usage order.

Also, although not shown in FIG. 10, in a state where defect information including information about replacement blocks of the spare area is removed from the defect management area due to reinitialization, the system controller 105 may control the pickup to read from the defect management area the next available position pointer of the spare area which indicates the first usable spare block in the usage order of the spare area.

According to an embodiment, since information of a spare area in an information storage medium that performs defect management is effectively managed, a time for defect management can be effectively reduced.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An information storage medium, comprising:
a user data area configured to record user data;
a spare area comprising spare blocks, each spare block configured to replace a defective block occurring in the user data area; and
a defect management area in which information about each defective block occurring in the user data area is recorded,
wherein the spare blocks of the spare area comprise usable spare blocks, the usable spare blocks comprising
at least one first usable spare block with a replacement block existing in forward parts of the at least one first usable spare block in a usage order, and
at least one second usable spare block without a replacement block existing in forward parts of the at least one second usable spare block in the usage order,
wherein a next available position pointer of the spare area is recorded in the defect management area, the next available position pointer of the spare area indicating the first block from among the at least one second usable spare block.

2. A recording apparatus for recording data on an information storage medium, the recording apparatus comprising:
a pickup configured to record data on the information storage medium, the information storage medium comprising
a user data area configured to record user data;
a spare area comprising spare blocks, each spare block configured to replace a defective block occurring in the user data area; and
a defect management area in which information about each defective block occurring in the user data area is recorded,
wherein the spare blocks of the spare area comprise usable spare blocks, the usable spare blocks comprising
at least one first usable spare block with a replacement block existing in forward parts of the at least one first usable spare block in a usage order, and
at least one second usable spare block without a replacement block existing in forward parts of the at least one second usable spare block in the usage order; and
a control unit configured to control the pickup to record a next available position pointer of the spare area in the defect management area, the next available position pointer of the spare area indicating the first block from among the at least one second usable spare block.

3. A reproducing apparatus for reproducing data from an information storage medium, the reproducing apparatus comprising:
a pickup configured to reproduce data from the information storage medium, the information storage medium comprising
a user data area configured to record user data;
a spare area comprising spare blocks, each spare block configured to replace a defective block occurring in the user data area; and
a defect management area in which information about each defective block occurring in the user data area is recorded,
wherein the spare blocks of the spare area comprise usable spare blocks, the usable spare blocks comprising
at least one first usable spare block with a replacement block existing in forward parts of the at least one first usable spare block in a usage order, and
at least one second usable spare block without a replacement block existing in forward parts of the at least one second usable spare block in the usage order; and
a control unit configured to control the pickup to reproduce a next available position pointer of the spare area from the defect management area, the next available position pointer of the spare area indicating the first block from among the at least one second usable spare block.

4. A method of recording data on an information storage medium, the method comprising:
recording data on the information storage medium, the information storage medium comprising
a user data area for recording user data;
a spare area comprising spare blocks, each spare block for replacing a defective block occurring in the user data area; and
a defect management area in which information about each defective block occurring in the user data area is recorded,
wherein the spare blocks of the spare area comprise usable spare blocks, the usable spare blocks comprising
at least one first usable spare block with a replacement block existing in forward parts of the at least one first usable spare block in a usage order, and
at least one second usable spare block without a replacement block existing in forward parts of the at least one second usable spare block in the usage order; and recording a next available position pointer of the spare area in the defect management area, the next available position pointer of the spare area indicating the first block from among the at least one second usable spare block.

5. A method of reproducing data from an information storage medium, the method comprising:

reproducing data from the information storage medium, the information storage medium comprising a user data area for recording user data;

a spare area comprising spare blocks, each spare block for replacing a defective block occurring in the user data area; and a defect management area in which information about each defective block occurring in the user data area is recorded, wherein the spare blocks of the spare area comprise usable spare blocks, the usable spare blocks comprising at least one first usable spare block with a replacement block existing in forward parts of the at least one first usable spare block in a usage order, and at least one second usable spare block without a replacement block existing in forward parts of the at least one second usable spare block in the usage order; and reproducing a next available position pointer of the spare area from the defect management area, the next available position pointer of the spare area indicating the first block from among the at least one second usable spare block.

* * * * *